United States Patent
Kubat

Patent Number: 6,041,717
Date of Patent: Mar. 28, 2000

[54] MECHANIC'S TOOL AND PARTS TRAY

[76] Inventor: Dan Z. Kubat, 518 Alondra Dr., Huntington Beach, Calif. 92648

[21] Appl. No.: 09/283,259

[22] Filed: Apr. 1, 1999

[51] Int. Cl.[7] .............................. A47B 23/00; B60R 11/00
[52] U.S. Cl. ........................... 108/44; 220/483; 224/547; 224/553; 224/562; 224/564; 248/206.5; 248/309.1; 248/309.4
[58] Field of Search .............................. 108/44; 220/483; 224/311, 547, 557, 562, 564, 566; 248/205.6, 206.1, 206.3, 210, 222.51, 229.15, 229.16, 229.25, 229.26, 231.71, 231.81

[56] References Cited

U.S. PATENT DOCUMENTS

| | | | |
|---|---|---|---|
| 569,813 | 10/1896 | Chamberlain | 224/458 |
| 1,460,760 | 7/1923 | McGee | 248/298.1 |
| 1,593,834 | 7/1926 | McNeal et al. | 108/47 |
| 2,680,523 | 6/1954 | Heeter | 108/44 |
| 3,140,069 | 7/1964 | McBurney et al. | 248/514 |
| 3,535,508 | 10/1970 | Warshauser | 362/396 |
| 5,078,281 | 1/1992 | Johnson | 211/88 |
| 5,331,904 | 7/1994 | DiSimone et al. | 108/44 |
| 5,390,837 | 2/1995 | Ruffolo, Jr. | 224/42.45 |
| 5,405,004 | 4/1995 | Vest et al. | 206/350 |
| 5,699,910 | 12/1997 | Kubat | 206/373 |

Primary Examiner—Allan N. Shoap
Assistant Examiner—Reginald A. Brown
Attorney, Agent, or Firm—Edgar W. Averill, Jr.

[57] ABSTRACT

A mechanic's tray assembly for holding tools and small parts, and removably adherable to both horizontal and non-horizontal surfaces. The tray assembly includes a shallow-walled tray and a pair of C-shaped support tracks fixedly secured to the tray. A pair of removably-adhering assemblies, independent of each other and preferably having magnets, are slidably and pivotally held on the C-shaped support tracks by support arms. The support arms have cylindrically-shaped holes through which the C-shaped support tracks extend. The cylindrically-shaped holes engage and grip the support tracks by means of a cantilever moment produced at the tube-shaped holes, thereby enabling the tray to be held at a desired tray angle.

10 Claims, 2 Drawing Sheets

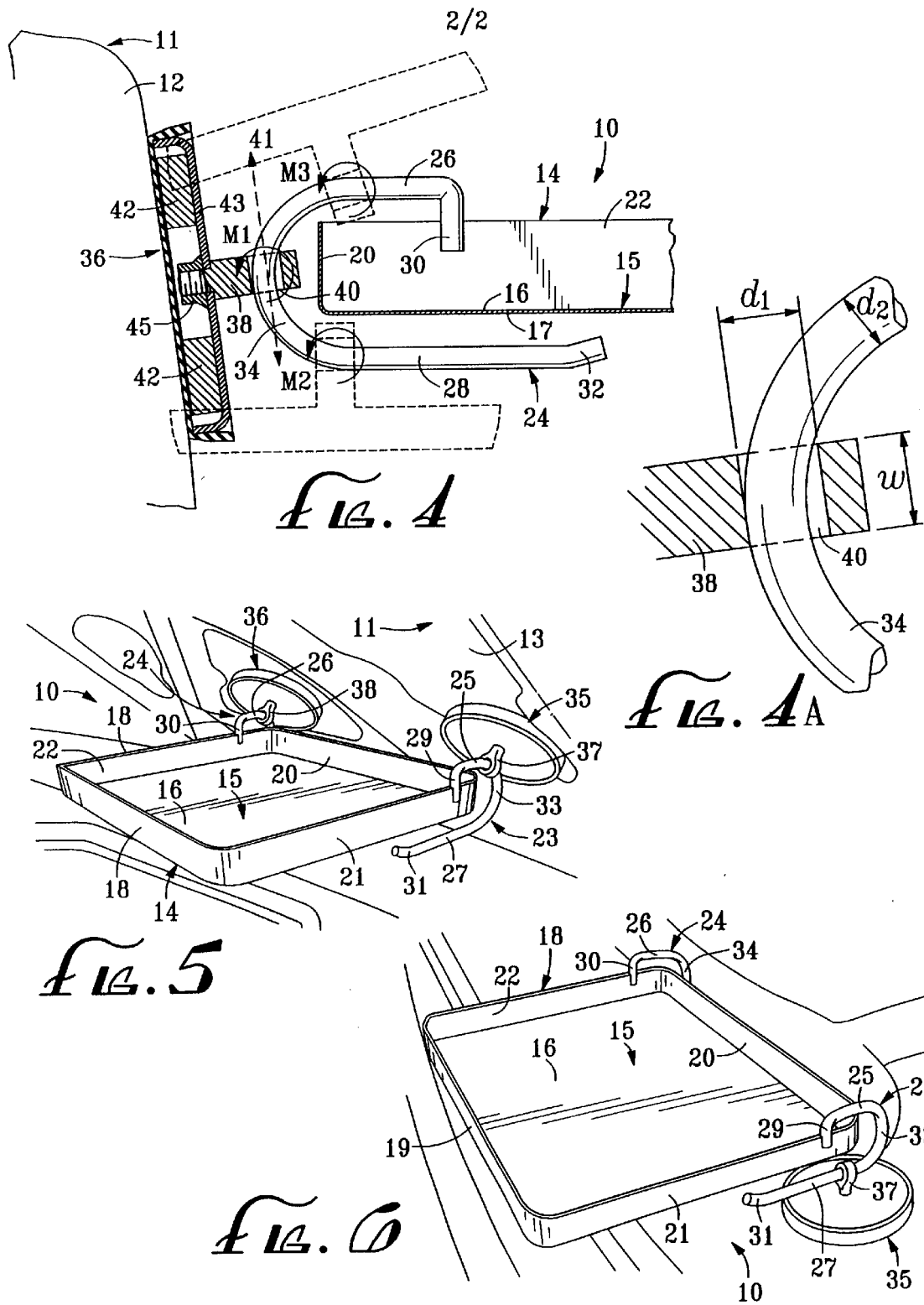

MECHANIC'S TOOL AND PARTS TRAY

BACKGROUND OF THE INVENTION

The field of the invention generally pertains to receptacles. The invention relates more particularly to trays for holding tools, parts, and the like while working on machinery.

During the repair and/or maintenance of machinery, such as an automobile engine, it is common to remove many small parts such as nuts, bolts, and washers. Many times there is no convenient spot to place the small parts for later reinstallation. And often the small parts fall into the engine compartment or are otherwise misplaced, resulting in frustration and delay.

Various magnetically held trays have been used in an effort to alleviate this problem and facilitate repair and/or maintenance operations. For example, in U.S. Pat. No. 5,405,004, a tray is shown having a magnet positioned in the center of the floor of the tray. Although this tray may be useful on horizontal ferromagnetic surfaces, often there are repair and/or maintenance operations where a horizontal ferromagnetic surface is not available.

In U.S. Pat. No. 5,078,281 a magnetically held tray is shown pivotally affixed to a U-shaped bracket having a magnet. The tray angle is adjustable on the bracket by means of thumb screws. Although this tray does not require a horizontal surface, it requires a relatively large flat ferromagnetic surface for appropriate use. Moreover, this tray requires separate screw-type adjustments to release and hold the tray at various angles. This tends to be cumbersome and inconvenient, especially when the nature of the repair or maintenance operation requires the mechanic to move to multiple locations having different surface angles.

Another example of a tool tray utilizing screw-type adjustments for pivoting the tray angle is shown in U.S. Pat. No. 5,331,904. The tool tray is supported by tray support ends adjustable to various engine compartment sizes, and includes knobs at each end to adjust and hold the tray on a level plane. The utility of this tool tray is limited, however, because it cannot be used anywhere other than in the automobile engine compartment. Moreover, this tool tray also requires separate screw-type adjustments to hold the tray at various angles.

In U.S. Pat. No. 5,699,910, a somewhat more flexible mechanic's tray is shown having a pair of independently movable magnet assemblies held to the tray by bolt and wing-nut fastener combinations. However, similar to the tool trays in U.S. Pat. No. 5,331,904 and U.S. Pat. No. 5,078,281, this tray also requires separate and independent screw-type adjustments to hold the tray at a desired angle. This method requires one hand to hold the tray while the other hand adjusts the fastener, and then repeating the procedure for the other end. Further, since the allowable load on the tray will directly depend on how tight the screw-type fastener is secured, this raises the uncertainty and risk of the tray dropping and losing its contents.

BRIEF SUMMARY OF THE INVENTION

It is an object of the present invention to provide a simple, convenient, and easily adjustable mechanic's tray which is removably adherable to both horizontal and non-horizontal surfaces.

The present invention is for a mechanic's tray assembly for holding tools, small parts, and the like while servicing machinery. The tray assembly includes a tray having a floor and a shallow-walled perimeter, preferably four walls, allowing easy reach of the small parts and tools. A pair of C-shaped support tracks are fixedly secured to the tray. And first and second removably-adhering assemblies, independent of each other and preferably having magnets, are slidably and pivotally held on the support tracks. Each removably-adhering assembly includes a support arm having a cylindrically-shaped hole through which the support tracks extend. The cylindrically-shaped holes function to engage and grip the support tracks by means of a cantilever moment produced at the cylindrically-shaped holes, thereby enabling the tray to be held at a desired tray angle.

The method of the present invention includes the steps of positioning the removably-adhering means, preferably magnets, on a surface, and adjustably sliding C-shaped support tracks of a tray through cylindrically-shaped holes on the removably-adhering means to a desired tray angle. The cantilever configuration of the tray produces a cantilever moment at the cylindrically-shaped holes, causing the cylindrically-shaped holes to engage and grip the support tracks at a desired tray angle.

BRIEF DESCRIPTION OF THE DRAWINGS

FIG. 4 is a view partly in cross-section taken along the line of 4—4 of FIG. 2.

FIG. 4A is an enlarged view partly in cross-section of the cylindrically-shaped hole and support track in FIG. 4.

FIG. 5 is a perspective view of the mechanic's tray assembly removably adhered to the underside of the hood of an automobile.

FIG. 6 is a perspective view of the mechanic's tray assembly removably adhered to a horizontal surface of the automobile.

DETAILED DESCRIPTION OF THE PREFERRED EMBODIMENTS

Figure 1:
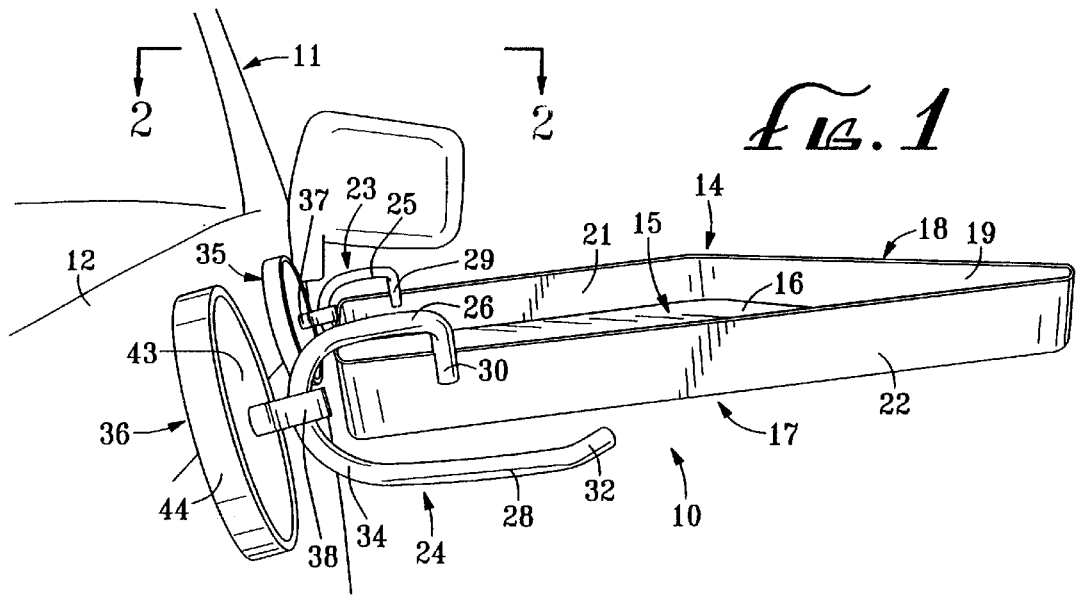
FIG. 1 is a perspective view of the mechanic's tray assembly removably adhered to a door of an automobile.

Referring now to the drawings, FIGS. 1, 2, and 4–6 show a mechanic's tray assembly, generally indicated at 10, for holding tools, small parts, and the like while servicing machinery. The mechanic's tray assembly generally comprises a tray, generally indicated at 14, first and second support tracks, generally indicated at 23 and 24 respectively, and first and second removably-adhering assemblies, generally indicated at 35 and 36 respectively. A typical use of the mechanic's tray assembly 10 is to hold small automobile parts and tools when servicing an automobile, generally indicated at 11, but is not limited only to such.

As can be best seen in FIGS. 1, 5, and 6, the tray 14 has a floor 15 with a top surface 16 and a bottom surface 17. A walled perimeter 18 surrounds the top surface 16 of the floor 15. Preferably, the floor 15 has a rectangular shape, and the walled perimeter 18 has four walls including a front wall 19, a back wall 20, a right sidewall 21, and a left sidewall 22. And preferably, the height of the walled perimeter 18 is shallow compared to the area of the floor 15, to allow convenient retrieval of tools and parts placed on the tray 14.

As best shown in FIGS. 1, and 4–6, the first and second support tracks 23 and 24 are fixedly secured to the tray 14.

Each support track 23, 24 has a generally C-shaped configuration with an upper track portion 25, 26, a lower track portion 27, 28, and a C-shaped curved portion 33, 34 connecting the upper track portion 25, 26 with the lower track portion 27, 28. The upper track portion 25, 26 has an upper terminus 29, 30, and the lower track portion 27, 28 has a lower terminus 31, 32. In one embodiment, the first and second support tracks 23 and 24 are secured to the right sidewall 21 and a left sidewall 22 respectively, with the C-shaped curved portions 33, 34 adjacent the back wall 20. The upper terminus 29, 30 of each support track 23, 24 is preferably affixed to the respective right sidewall 21 or left sidewall 22, while the lower terminus 31, 32 is left suspended. Further, the lower track portion 27, 28 is preferably longer than the upper track portion 25, 26 to enable the mechanic's tray assembly 10 to support a greater load when positioned on a horizontal surface.

As can be seen in FIGS. 1, 2, and 4–6, the mechanic's tray assembly 10 may be attached to various angled surfaces by means of first and second removably-adhering assemblies 35, 36 slidably and pivotally held on the first and second support tracks 25, 26 respectively. Generally, each removably-adhering assembly 35, 36 has a means for removably-adhering to a surface 42 (see FIG. 3) with a surface-contacting face 42', and a support arm 37, 38 having a cylindrically-shaped hole 39, 40 with a central axis 41 (see FIG. 4) parallel to the surface-contacting face 42' of the means for removably-adhering to a surface 42. The removably-adhering assemblies 35, 36 can be kept from sliding off the support tracks 23, 24 in several ways. In one embodiment, both the upper terminus 29, 30 and the lower terminus 31, 32 of each support track 23, 24 are affixed to the tray 14. In another embodiment, only one of the upper terminus 29, 30 or the lower terminus 31, 32 is affixed to the tray 14, while the non-affixed terminus is bent at an angle toward the tray 14. The bend prevents the removably-adhering assemblies 35, 36 from accidentally sliding off the support tracks 23, 24, while also allowing them to be slidably removed off the support tracks 23, 24.

Figure 3:
FIG. 3 is a perspective view of a disassembled removably-adhering assembly having a magnet as its means for removably-adhering to a surface.

Details of one preferred embodiment can be best seen in FIGS. 3 and 4 where the first and second removably-adhering assemblies 35, 36 are magnet assemblies 35, 36. Each magnet assembly 35, 36 has a doughnut-shaped magnet 42 affixed to and surrounded by a ferromagnetic cup 43, with the surface-contacting face 42' of the magnet 42 opposite the ferromagnetic cup 43. The support arm 37, 38 is secured to the ferromagnetic cup 43 by a nut 45. And a cup-shaped elastomeric layer 44 covers the surface-contacting face 42' of the magnet 42 to prevent scratching or otherwise damaging the adhering surface. Since the degree of load-bearing adhesion to ferromagnetic surfaces will depend on the size and power of the magnets 42, they may be suitably sized and powered for a specified load range depending on the contemplated use. Additionally, greater magnetic adhesion can be obtained if used without the elastomeric cover 44. This is particularly useful when scratch or paint damage to the adhering surface is of little concern. Alternatively to magnets 42, the removably-adhering assemblies 35, 36 may utilize suction cups as the means for removably-adhering to a surface. The use of suction cups in place of magnets 42 will enable removable adhesion of the mechanic's tray assembly 10 on non-ferromagnetic surfaces as well, such as glass and other smooth surfaces.

The first and second support tracks' 23, 24 ability to slidably move through the cylindrically-shaped holes 39, 40 of the support arms 37, 38 depend on certain critical dimensions of both the cylindrically-shaped holes 39, 40 and the support tracks 23, 24. As shown in FIG. 4A, these critical dimensions include the diameter $d_1$ and depth w of the cylindrically-shaped holes 39, 40, and the cross-sectional diameter $d_2$ of the support tracks 23, 24. Movement of the support tracks 23, 24 through the cylindrically-shaped holes 39, 40 is particularly problematic at the C-shaped curved portions 33, 34 of the support tracks 23, 24. At the C-shaped curved portions 33, 34, absolute movement through the cylindrically-shaped hole will depend on the radius of curvature R of the C-shaped curved portion 33, 34. Moreover, the relative ease of movement of the removably-adhering assemblies 35, 36 through the cylindrically-shaped holes 39, 40 will also depend on the radius of curvature R. The acceptable range of R can be best expressed by the following formulas:

where r is the lower limit of the radius of curvature R, w is the depth of the cylindrically-shaped holes 39, 40, and $d_1$ is the diameter of the cylindrically-shaped holes 39, 40, and $d_2$ is the diameter of the support tracks 23, 24. Any radius of curvature R greater than the lower limit r will allow slidable movement of the removably-adhering assemblies 35, 36 along the support tracks 23, 24. Preferably, the radius of curvature R should provide a sufficient margin of clearance, e.g. five percent greater than r, to compensate for possible kinks and irregularities in the support tracks 23, 24.

As can be best seen in FIG. 4, the tray 14 produces a classic cantilever configuration when attached to a surface by the removably-adhering assemblies 35, 36. The tray 14 adjusted to a desired angle is able to maintain its position by means of a cantilever moment (for example $M_1$) produced at the cylindrically-shaped holes 39, 40 of the support arms 37, 38. The tray 14 loaded with tools and small parts exerts a downward force which is compensated by an equal and opposite force and a moment at the cantilever base, i.e. the cylindrically-shaped holes 39, 40 of the support arms 37, 38. Even without any tools or parts placed on the tray 14, the weight of the tray 14 itself produces a cantilever moment $M_1$ sufficient to hold the tray 14 in position. The cantilever moment $M_1$ causes the cylindrically-shaped holes 39, 40 to contact, engage, and grip the support tracks 23, 24. A change in the relative angular position of the tray with respect to the removably-adhering assemblies 35, 36 will also change the cantilever moment $M_1$ produced. As can be seen in FIG. 4, three different cantilever moments $M_1$, $M_2$, and $M_3$ exist at the different angular positions of the removably-adhering assemblies, the removably-adhering assemblies relating to $M_2$ and $M_3$ shown in phantom view. The magnitude of the moment $M_1$ will be greatest because the cantilever base, i.e. the cylindrically-shaped holes 39, 40 are furthest from the front wall 19 of the tray 14, i.e. the tip of the cantilever.

Figure 2:
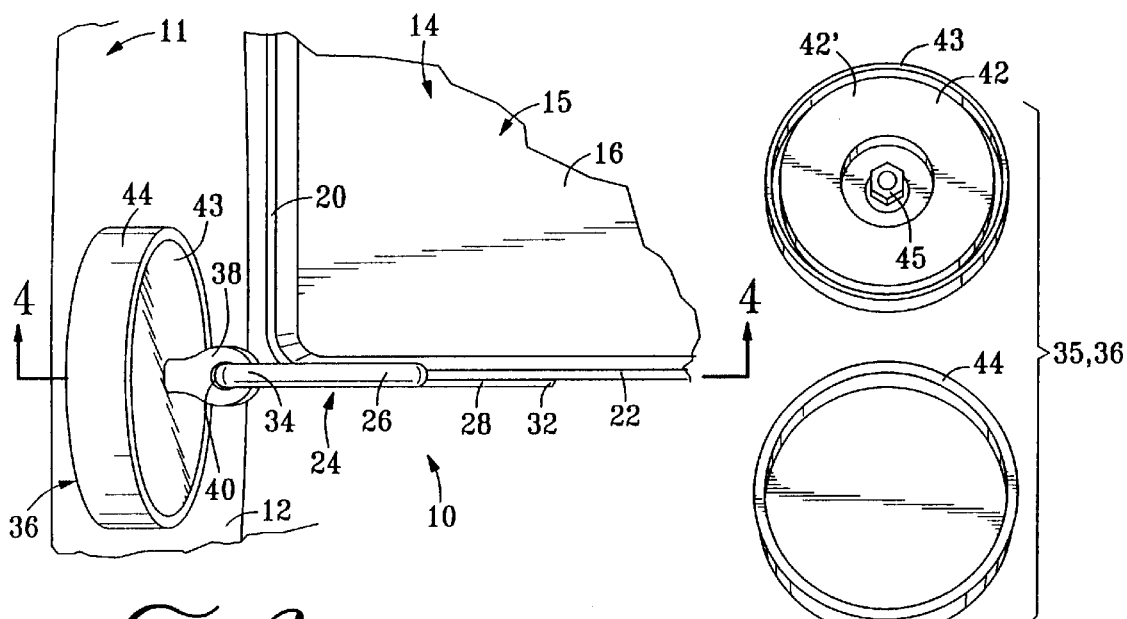
FIG. 2 is a top view of the mechanic's tray assembly taken along the line of 2—2 of FIG. 1.

Based on the above description of the invention and applicable principles of physics, the mechanic's tray assembly 10 can be positioned on any angled surface while maintaining a level horizontal plane. FIGS. 1–6 show the mechanic's tray assembly 10 releasably adhered to different areas of the automobile 11. In FIGS. 1, 2 and 4 the mechanic's tray assembly 10 is shown removably adhered to a non-horizontal surface, such as a door 12 of the automobile 11. In FIG. 5 the mechanic's tray assembly 10 is shown removably adhered to the underside surface of the hood 13 of the automobile 11. And in FIG. 6, the tray assembly 10 is removably adhered to a horizontal surface on the automobile 11. As discussed previously, the longer lower portion 27, 28 of the support track 23, 24, enables the tray 14 to support a greater load. By moving the removably-adhering assemblies 35, 36 closer towards the center of the tray 14, and near the center of gravity, the magnitude of the cantilever moment (for example $M_3$ in FIG. 4) at the cylindrically-shaped hole 39, 40 is effectively decreased. This allows the tray 14 to support a greater load.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A mechanic's tray assembly for holding tools and small parts, while servicing machinery, said mechanic's tray assembly comprising:

a tray having a floor with a top and a bottom surface, and a walled perimeter surrounding the top surface of the floor;

a first and a second support track fixedly secured to the tray, wherein said first support track is parallel to the second support track, each support track having a generally C-shaped configuration with an upper track portion having an upper terminus, a lower track portion having a lower terminus, and a curved portion, at least one of said upper terminus and lower terminus being fixedly secured to said tray, whereby the upper track portion, the lower track portion, and the curved portion, are rigidly suspended from the tray; and a first removably-adhering assembly slidably and pivotally held on said first support track, and a second removably-adhering assembly slidably and pivotally held on said second support track and independently movable with respect to said first removably-adhering assembly, said first and second removably-adhering assemblies each including means for removably-adhering to a surface having a surface-contacting face, and a support arm centrally affixed to the means for removably-adhering to a surface, said support arm having a generally cylindrically-shaped hole with a central axis parallel to the surface-contacting face, the cylindrically-shaped hole having a diameter greater than the diameter of said first and second support tracks and the respective support track extending therethrough, whereby said removably-adhering assemblies are removably adhered to a desired surface and said tray and support tracks are slidably positioned through the cylindrically-shaped hole of the support arm to a desired position.

2. A mechanic's tray assembly as in claim 1, wherein the means for removably-adhering to a surface is a magnet.

3. A mechanic's tray assembly as in claim 1, wherein the floor of said tray has a rectangular shape, and the walled perimeter of said tray comprises a front wall, a right side wall, a left side wall, and a back wall.

4. A mechanic's tray assembly as in claim 3, wherein said first and second support tracks are secured to the right side wall and the left side wall respectively, with the curved portion of each support track being adjacent the back wall.

5. A mechanic's tray assembly as in claim 4, wherein the upper terminus of each support track is fixedly secured to the respective right side wall or left side wall.

6. A mechanic's tray assembly as in claim 1, wherein the upper terminus of each support track is fixedly secured to the tray.

7. A mechanic's tray assembly as in claim 6, wherein the lower track portion of each support track has a length greater than the length of the upper track portion.

8. A mechanic's tray assembly as in claim 7, wherein the lower terminus of each support track is angled toward the tray, whereby the first and second removably-adhering assemblies are prevented from sliding off the first and second support tracks respectively.

9. A method of adjusting the angle of a tray having C-shaped support tracks affixed to the tray, and having removably-adhering means slidably and pivotally held on the C-shaped support tracks by means of cylindrically-shaped holes on the removably-adhering means, said method comprising:

positioning the removably-adhering means on a desired surface;

lifting the tray slightly to cause the cylindrically-shaped holes to release their grip on the support tracks;

sliding the support tracks through the cylindrically-shaped holes until the tray reaches a desired tray angle;

releasing the tray, whereby the cylindrically-shaped holes engage and grip the support tracks by cantilever moments produced at the cylindrically-shaped holes.

10. A method of adjusting the angle of a tray as in claim 9, wherein the desired surface is a ferromagnetic surface, and the removably-adhering means are magnets.

* * * * *